W. A. WARD.
SEEDER AND FERTILIZER DISTRIBUTER.
APPLICATION FILED JUNE 22, 1918.
1,303,136.
Patented May 6, 1919.
5 SHEETS—SHEET 1.
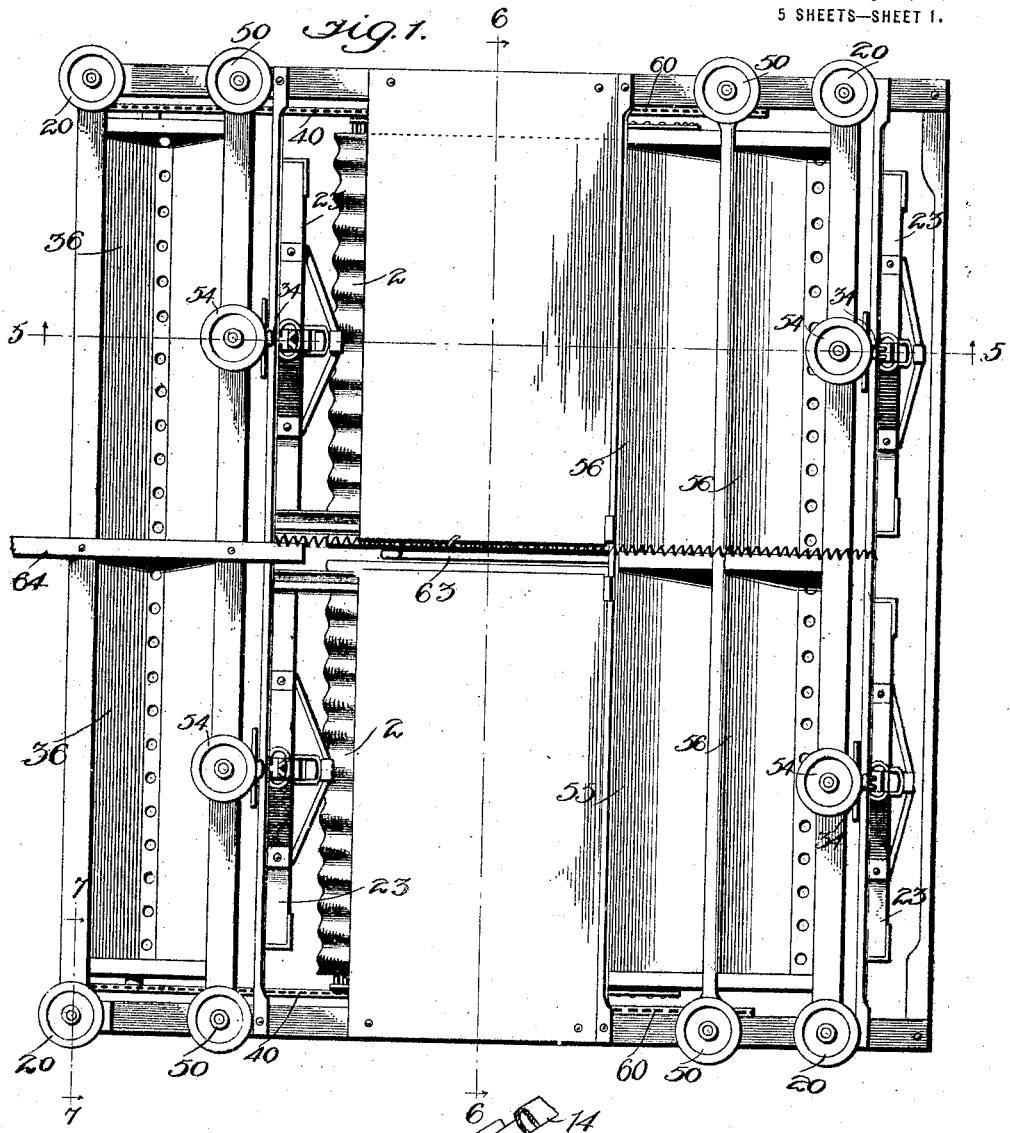
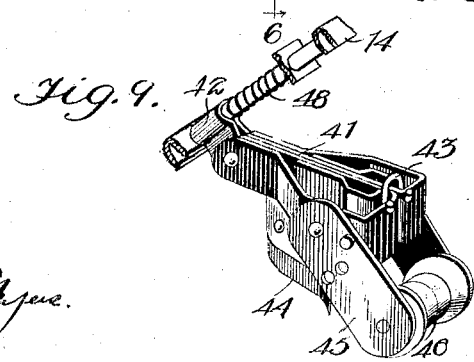
WITNESSES
INVENTOR
WILLIAM A. WARD,
BY
ATTORNEYS

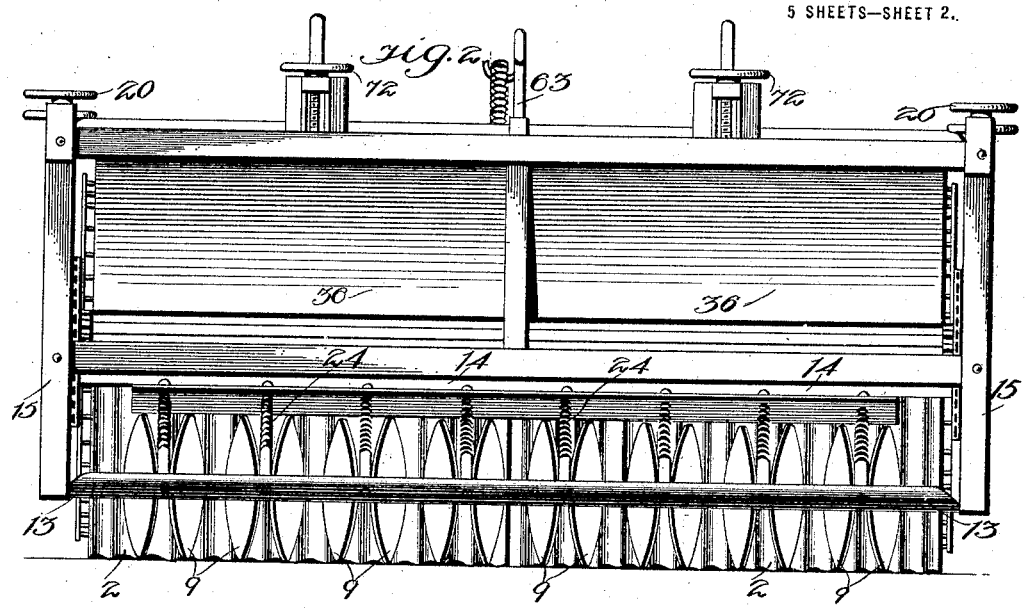

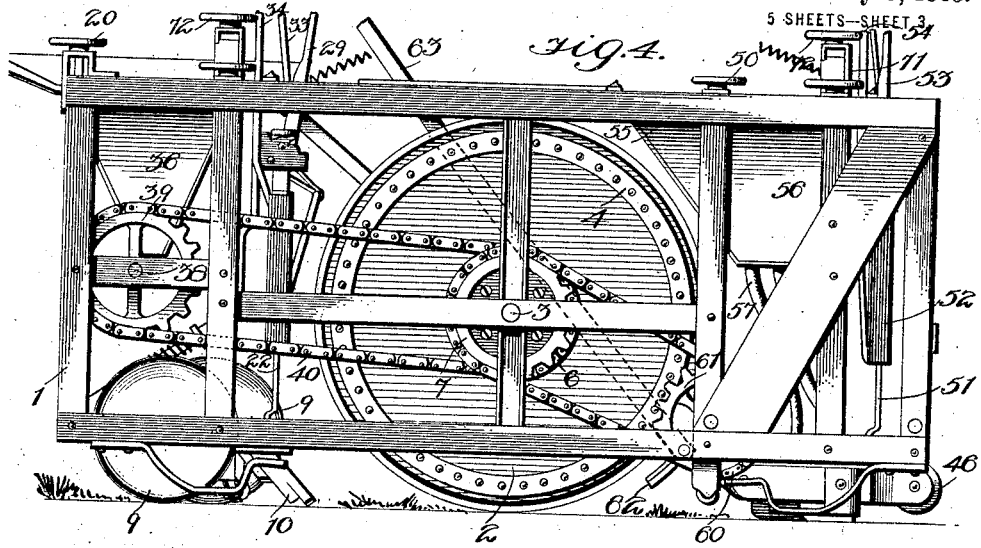

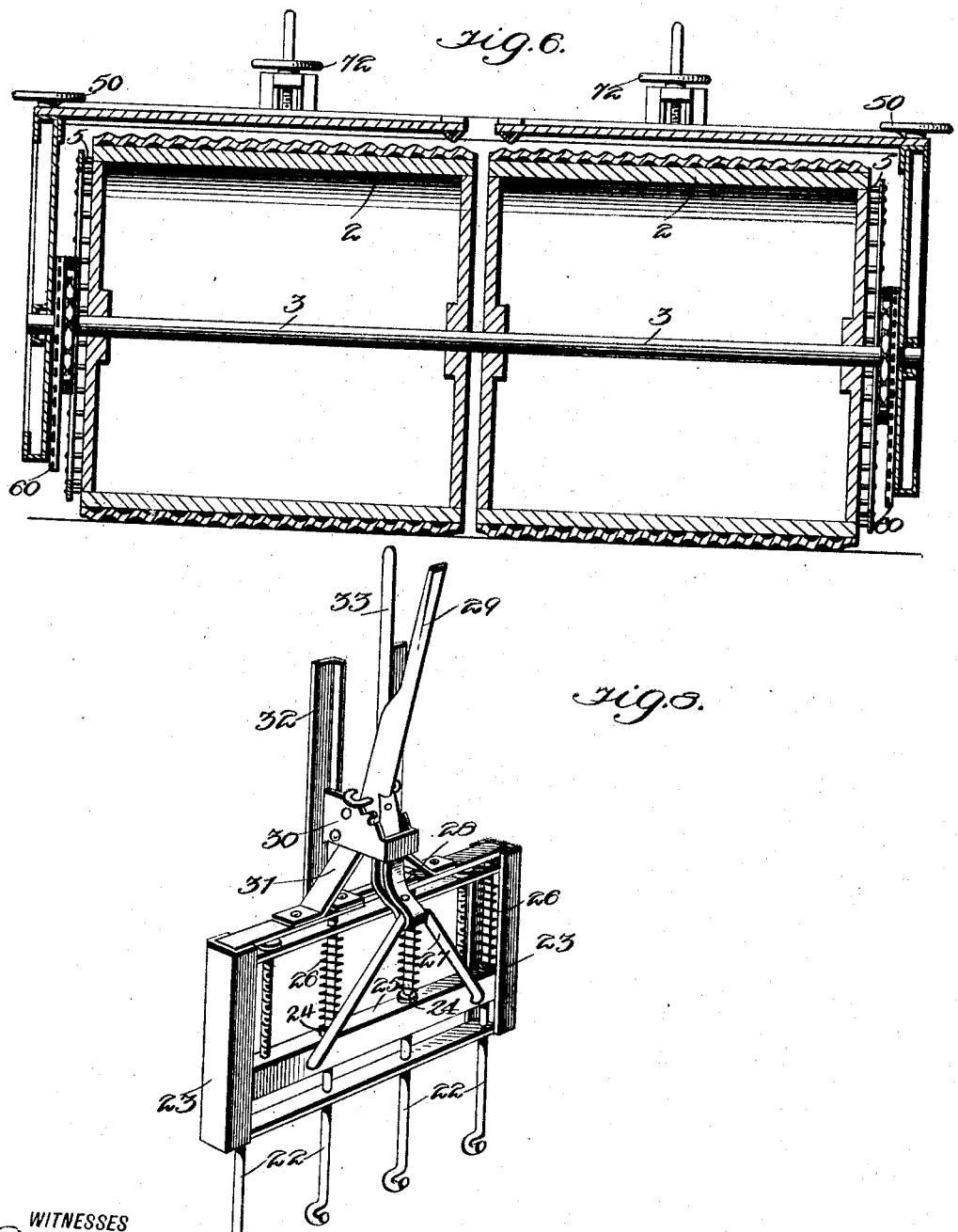

W. A. WARD.
SEEDER AND FERTILIZER DISTRIBUTER.
APPLICATION FILED JUNE 22, 1918.
1,303,136.
Patented May 6, 1919.
5 SHEETS—SHEET 5.
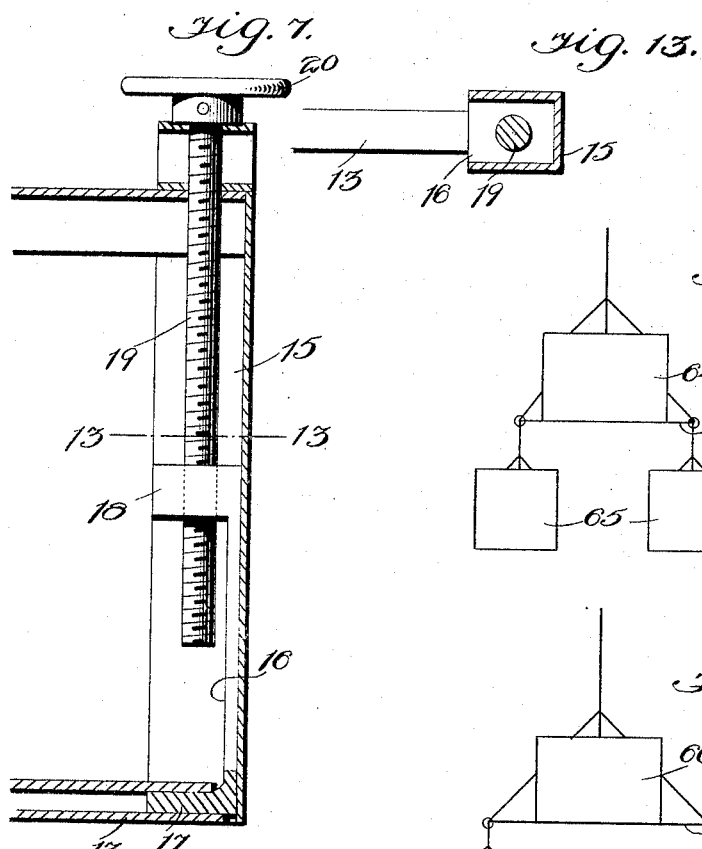
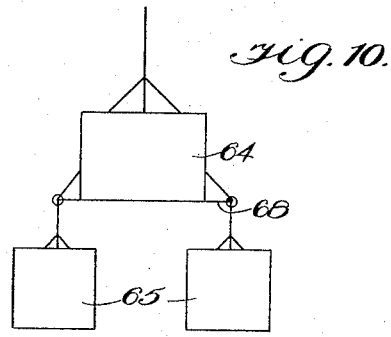
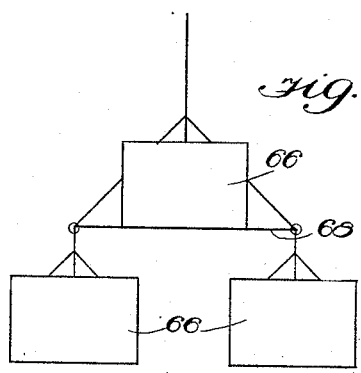
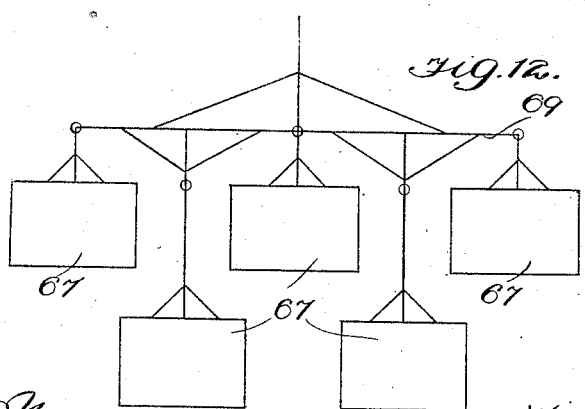
WITNESSES
George C. Myers
INVENTOR
WILLIAM A. WARD,
BY
ATTORNEYS

UNITED STATES PATENT OFFICE.

WILLIAM ALLEN WARD, OF LOS ANGELES, CALIFORNIA, ASSIGNOR TO JEAN STUART WARD, OF LOS ANGELES, CALIFORNIA.

SEEDER AND FERTILIZER-DISTRIBUTER.

1,303,136.   Specification of Letters Patent.   Patented May 6, 1919.

Application filed June 22, 1918. Serial No. 241,428.

*To all whom it may concern:*

Be it known that I, WILLIAM A. WARD, a citizen of the United States, and a resident of Los Angeles, in the county of Los Angeles and State of California, have invented certain new and useful Improvements in Seeder and Fertilizer-Distributers, of which the following is a specification.

My invention is an improvement in pulverizers, seeders and fertilizers, and has for its object to provide a device of the character specified adapted for preparing and planting the seed bed for all kinds of grain at a single operation.

In the drawings:

Figure 1 is a top plan view of the improved pulverizer, seeder and fertilizer;

Fig. 2 is a front view;

Fig. 3 is a rear view;

Fig. 4 is an end view;

Figs. 5, 6 and 7 are sections on the lines 5—5, 6—6 and 7—7 respectively, of Fig. 1, each view looking in the direction of the arrows adjacent to the line;

Fig. 8 is a perspective view of one of the supporting racks;

Fig. 9 is a perspective view of one of the seeder units;

Figs. 10, 11 and 12 are diagrammatic views showing different methods of combining the improved pulverizer, seeder and fertilizer into gangs;

Fig. 13 is a section on the line 13—13 of Fig. 7.

In the present embodiment of the invention, a suitable supporting frame 1 is provided, and this frame is supported by a roller 2, the said roller being sectional, consisting of two hollow drums arranged in alinement, and journaled on a common shaft 3 which is stationary in the frame. As shown, each roller has its peripheral surface annularly corrugated, and each section of the roller has at its outer end a species of gear wheel formed by a ring 4, which is nearly but not quite so large as the circumference of the roller, as shown.

In the present instance, the corrugated peripheries of the sections are formed by facing sheets of suitably corrugated metal. The roller carries also at each end a pair of sprocket wheels 6 and 7 for a purpose to be presently described, and cultivating mechanism is arranged at the front of the frame for preparing the seed bed.

Each of the said mechanisms consists of a support 8 of substantially U-shape, having one arm longer than the other, and disk cutters 9 are journaled on the arms, the said cutters being placed with their convex surfaces in, and being inclined toward each other at the front edges, and being arranged one in advance of the other, as shown.

Cultivating blades 10 are connected with each support 8, the said blades being in the present instance four in number, and they are arranged to cut the ridge of soil not touched by the disk cutters and to further pulverize and level the land. Each support is provided at its front end with a sleeve or clip 11, and each sleeve or clip engages over an oblique shaft or rod 12 and is clasped and journaled to the support 8 in the same manner as clip 42 is journaled to support 41 in Fig. 9. The supports in the present instance are 8 in number, four adjacent to each roller section. All of the supports are supported by channel shaped bars 13 and 14. The ends of the shafts are held in the bars, and the ends of the bars are movable vertically in guideways 15 in the frame.

A bar 16 is slidable in each guideway, each bar having at its lower end a lug 17 engaging with the adjacent end of the adjacent channel bar and having at its upper end a similar lug 18, with which the screw 19 has threaded engagement. Each screw has a hand wheel 20 at its upper end, and it will be obvious that by means of the four screws the two channel bars may be raised and lowered, to simultaneously raise and lower all of the cultivating units.

A coil spring 21 encircles each of the shafts or rods 12 between the sleeve 11 and a stop on the rod, the spring acting normally to hold the sleeve at the lower end of the rod and the stop is adjustable by means of screw threaded rods which control the compression of the spring as shown in Fig. 9. At their rear ends each unit is engaged by a hook on the lower end of a rod 22, and the rod of the four units adjacent to each roller section passes upwardly through a slot arranged transversely of the lower side member of a substantially rectangular frame 23, which is mounted to move vertically just in front of the adjacent roller section and which slot permits the unit to move rearwardly. In each of these frames 23 there is mounted to move vertically a second frame 25, and the rods 22 pass through the lower side member of the frame 23, and through both side members of the frame 25. The end members of the frame 23 are channel shaped as shown in Fig. 8, and the ends of the frame 25 move in these channels.

A coil spring 26 encircles each rod 22 between the side members of the frame 25, each rod 22 having a collar 24 between the lower end of spring 26 and the lower side member of frame 25, by reason of which collar, and by compressing spring 26, each rod can rise independently. The frame 25 consists of upper and lower side members, which are connected by screw threaded rods, controlling the compressing of the springs, and a yoke 27 is connected with the lower side member of the frame. The arms of this yoke are connected with the lower side member, and the body is engaged by a loop 28 on a lever 29 pivoted to a substantially U-shaped bracket 30 on the frame 23.

This bracket is supported by arms 31 rigidly connected with the frame, and the bracket is connected to angle guides 32 which extend upwardly from the frame. The lever has latch mechanism, indicated at 33, which coöperates with teeth on the upper edges of the bracket 30 to hold the lever in adjusted position, and loop 28 being an offset of lever 29, it will be obvious that by swinging the lever the frame 25 will be raised and lowered. Each of the frames 23 may be further adjusted laterally by means of a lever 34. Each of these levers 34 is pivoted to the frame as indicated at 35, and the lower end of each lever is offset rearwardly and pivoted to the lower side member of the adjacent frame 23. By swinging the upper end of the lever the frame 23 may be moved laterally and vertically, carrying with it the rear ends of the cultivating units, and by swinging the lever 29 in the proper direction the frame 25 may be raised or lowered to raise or lower the rear ends of the cultivating units.

A hopper 36 for broadcasting lime and fertilizer, is supported above the cultivating units, the said hopper having a series of delivery openings in its bottom, as shown in Fig. 1, and these openings may be closed by a gate valve 37 mounted to slide in the bottom of the hopper. The distributing shaft 38 for the fertilizer is journaled in the frame below the hopper, and this shaft has at each end a sprocket wheel 39. The wheels 39 are connected by sprocket chains 40 with the wheels 6 before mentioned in such manner that when the roller 2 is rotating the distributing shaft will be driven.

A series of seeding units is arranged behind the roller, each of the said units (shown more particularly in Fig. 9) consisting of a supporting frame 41 having at its front end a sleeve or clevis 42. Referring to Fig. 9, it will be noticed that the frame, which is approximately triangular in outline, has a loop 43 at its rear end, and by means of the clevis and the loop each unit is supported. Each unit carries three similar shoes 44, each consisting of two portions diverging from each other toward their rear ends, the front corners of the members being rounded and sharpened, in such manner that each shoe will form an open furrow into which the seed may be dropped.

Each supporting frame 41 has rearwardly and downwardly depending arms 45 at its opposite sides, and these arms support a corrugated roller 46, the corrugations of the roller corresponding to the corrugations of the roller 2. The clevis of each unit is mounted to slide upon an oblique shaft 47 and a coil spring 48 normally forces each clevis downward and the compression of the springs is regulated by adjustable stops and screw threaded rods in the same manner as the springs 21 are compressed on the shaft 12. The shafts 47 are supported by channel plates 49 in the same manner as the shafts 12 of the cultivator units, and the channel plates are arranged to be vertically moved by the screw threaded rods 50, corresponding in all respects to the rods 19 of the cultivator units. The rear ends of the seeder units are adjusted vertically in the same manner as the rear ends of the cultivator units, the said seeder units being arranged in series of four, corresponding to the arrangement of the cultivator units.

The adjusting mechanism, consists of the rods 51 corresponding to the rods 22 of the cultivator units and connected to the frame, indicated generally at 52 in the same manner as are the rods 22 connected to the frames 23 and 25, and adjusted by means of the levers 53 and 54, corresponding in all respects to the levers 29 and 34 and the rods 51 are encircled by springs identical with and compressed in the same manner as the springs 26 on the rods 22.

The small grain seed such as wheat is supplied to the seeder units by a hopper 56, and fertilizer is supplied by an adjoining compartment 55, the said hoppers being arranged above the seeder units. Hose 57 and 58 lead from the respective hoppers delivering the seed and fertilizer to the units. The controlling shaft 59 for the seeding hopper and fertilizing hopper is driven by a sprocket chain 60 which connects a sprocket wheel 61 of the shaft with the sprocket wheel 7 before mentioned on the roller 2.

The large seed such as corn cotton and beans, is supplied to the seeder units by seed boxes 73 supported by a bar 74 of the frame arranged above and to the rear of the seeder units. The controlling shaft 75 for the boxes for large seeds is driven by sprocket wheels 76 and by sprocket chains connecting sprocket wheels on shaft 59 which for this purpose acts as a counter-shaft driven by chain 60. The three similar shoes 44 carried by each seeder unit, are intended for small grain such as wheat. These three shoes are detachable and interchangeable for one larger shoe similarly constructed for planting large seeds such as corn, and which arrangement provides for spacing the rows any desired width without otherwise changing the units. The seed corn is conducted from the seed boxes 73, and delivered to the seeder units by hose similar to 57 and 58.

The controlling shafts for the seed and fertilizer hoppers and boxes are sectional, each section corresponding in length to the length of the adjacent section of the roller, each section of shaft being driven from the outer end of the adjacent roller section as above described, and each section of the roller revolving independently on the stationary shaft 3.

Mechanism is provided for scraping the roller, the said mechanism comprising a scraper 62 which is grooved on the face adjacent to the roller to correspond with the grooves of the roller and to provide ribs on the scraper fitting within the grooves of the roller. The scraper is pivoted at one edge adjacent to the roller, and the other edge is mounted to swing toward and from the roller to engage the periphery thereof, and the scraper is swung by means of a lever 63 which is connected to the scraper at one edge and extends up between the sections of the roller 2. Suitable draft apparatus, indicated at 64, may be connected with the center of the frame to draw the same.

In operation, the improved pulverizer, seeder and fertilizer is drawn through the field in any suitable or desired manner, the cultivating units and the seeding units being adjusted to the proper position. As the machine travels over the ground the disks 9 and the blades 10 will thoroughly pulverize the soil, and the soil will be rolled compactly and further pulverized by the roller 2. The seeding units will deposit the seed and the rollers 46 will cover the same. The yielding mounting of the front ends of the cultivator and seeder units permits the units to rise and recede to avoid an obstacle, and the yielding mounting at the rear permits the rear ends to rise and recede for the same purpose.

By means of the screws 20 and 50 the units may be adjusted at the proper depth with respect to the roller 2. This roller supports the weight of the frame and provides driving mechanism for the fertilizer and seed distributer. By means of the levers 34 and 54 the rear ends of the cultivator units and of the seeding units may be drawn sidewise in turning the machine or whenever it is necessary for any other purpose. By arranging the lime and fertilizer distributer in front of the cultivating units the fertilizer is thoroughly mixed with the soil. If desired the fertilizer distributer shaft and the seed distributer shaft may be driven from the gear wheel formed by the ring 4, and this gear wheel cannot become clogged with dirt because of its construction.

If desired the improved cultivator may be arranged in gangs. As shown in Fig. 10, a gang of two is provided, one complete machine 64 and two half machines 65, the complete machine being arranged in front and the half machines in rear and at the ends of the complete machine. In Fig. 11 three complete machines 66 are provided, while in Fig. 12 there are five complete machines 67. In Figs. 10 and 11 a stretcher bar 68 is arranged at each end of the front machine and at the rear thereof, and the draft apparatus of the machines 65 and 66 is connected with the stretcher bar. In Fig. 12 a stretcher bar 69 is provided, to which all of the machines are connected, and in each instance the machines in the front and rear rows are staggered with respect to each other. The levers 34 and 54 are adjustable vertically, and since these levers are the sole support of the frames 23 and 52 it will be evident that when the levers are adjusted vertically the frames and the rear ends of the cultivating units and of the seeder units are also adjusted vertically. Each lever as shown is pivoted to a block 70 which is mounted to slide in a guide 71 in the frame, and screw threaded rods 72 similar to the rods 19 and mounted in the same manner are connected with the blocks to move the same. Thus each section of cultivating units and seeder units is complete in itself, capable of vertical adjustment and of lateral swinging movement, and the vertical adjustment does not interfere with the lateral swinging movement.

The necessary additional mechanism in common use for feeding or dropping seed, lime and fertilizer in connection with hoppers 36, 56 and 73 and controlling shafts 38, 59 and 75 respectively, is not shown or claimed as a part of my invention.

I claim:

1. An implement of the character specified comprising a frame, a roller journaled transversely of the frame for supporting the same, series of cultivating units arranged at the front of the frame, series of seeding units arranged at the rear of the frame, each series of units being simultaneously adjustable and being yieldably supported to permit the same to move upward, and means for swinging the rear end of each series laterally, said roller consisting of two similar sections arranged end to end, a series of cultivating units being in front of each section of the roller and a series of seeding units being behind each section of the roller.

2. An implement of the character specified comprising a frame, a roller journaled transversely of the frame for supporting the same, series of cultivating units arranged at the front of the frame, series of seeding units arranged at the rear of the frame, each series of units being simultaneously adjustable and being yieldably supported to permit the same to move upward, means for swinging the rear end of each series laterally, a lime distributer in front and above the cultivating units, a seed distributer with a fertilizer attachment above the seeding units, a second seed distributer above and to the rear of the seeding units, each delivering thereto, and a driving connection between said distributers and the roller.

3. An implement of the character specified, comprising a frame, a roller journaled transversely of the frame for supporting the same, series of cultivating units arranged at the front of the frame, series of seeding units arranged at the rear of the frame, each series of units being simultaneously adjustable and being yieldingly supported to permit the same to move upward, and means for swinging the rear end of each series laterally.

4. An agricultural implement comprising a roller, a frame supported by the roller, a series of cultivating units supported by the frame in front of the roller, a series of seeding units supported by the frame in the rear of the roller, each cultivating and seeding unit being supported to yield upwardly and backwardly at its front end and to yield upwardly and backwardly at its rear end, means for simultaneously adjusting each series vertically in the frame, and means for simultaneously swinging the rear end of each series laterally.

5. An agricultural implement comprising a roller, a frame supported by the roller, a series of cultivating units supported by the frame in front of the roller, a series of seeding units supported by the frame in rear of the roller, each cultivating and seeding unit being supported to yield upwardly and backwardly at its front end, and to yield upwardly and backwardly at its rear end, means for simultaneously adjusting each series vertically in the frame, a fertilizer distributer at the front of the frame, two seed distributers and a fertilizer distributer at the rear of the frame and delivering to the seeding units, and a driving connection between the distributers and the roller.

6. An agricultural implement comprising a roller, a frame supported by the roller, a series of cultivating units supported by the frame in front of the roller, a series of seeding units supported by the frame in rear of the roller, each cultivating and seeding unit being supported to yield upwardly and backwardly at its front end, and to yield upwardly and backwardly at its rear end, and means for simultaneously adjusting each series vertically in the frame.

7. An agricultural implement comprising a frame, a roller supporting the frame, a series of cultivating units in front of the roller and supported by the frame, a series of seeding units supported by the frame in rear of the roller, each of said units being supported to yield upwardly, means for simultaneously adjusting each series vertically, means for simultaneously swinging the rear ends of each series laterally, said means being adjustable with the series, means for distributing lime or fertilizer in front of the roller, means for distributing seed and fertilizer to the seeding units in rear of the roller and a driving connection between the said means and the roller.

8. An agricultural implement comprising a frame, a roller supporting the frame, a series of cultivating units in front of the roller and supported by the frame, a series of seeding units supported by the frame in rear of the roller, each of said units being supported to yield upwardly, and means for simultaneously adjusting each series vertically, and means for simultaneously swinging the rear ends of each series laterally, said means being adjustable with the series.

9. In an agricultural implement, a frame, pairs of bars supported transversely of the frame, the rear bar being at a higher level than the front bar, shafts supported by the bars longitudinally of the frame, a cultivating mechanism for each shaft and having a bearing at its front and slidable on the shaft, a spring normally pressing each bearing downward, and yielding means at the rear of the units for pressing the said units downwardly.

10. In an agricultural implement, a frame, pairs of bars supported transversely of the frame, the rear bar being at a higher level that the front bar, shafts supported by the bars longitudinally of the frame, a cultivating mechanism for each shaft and having a bearing at its front and slidable on the shaft, and a spring normally pressing each bearing downwardly.

11. An agricultural implement of the character specified, combining pulverizers, rollers, seeders and fertilizers, a frame, pairs of bars supported transversely of the frame, the rear bar being at a higher level than the front bar, oblique shafts supported by the bars longitudinally of the frame, a cultivating mechanism for each shaft in front of the roller, a seeding mechanism for each shaft in rear of the roller, each having a bearing at its front and slidable on the shaft, a spring normally pressing each bearing downwardly, the compression of the springs regulated by an adjustable stop and screw threaded rods, and yielding means at the rear of each unit for pressing said units downwardly, a spring normally pressing each unit downwardly, the springs being compressed by means of screw threaded rods.

WILLIAM ALLEN WARD.

Copies of this patent may be obtained for five cents each, by addressing the "Commissioner of Patents, Washington, D. C."